April 16, 1968 A. G. BODINE 3,378,075
SONIC ENERGIZATION FOR OIL FIELD FORMATIONS
Filed April 5, 1965 2 Sheets-Sheet 2
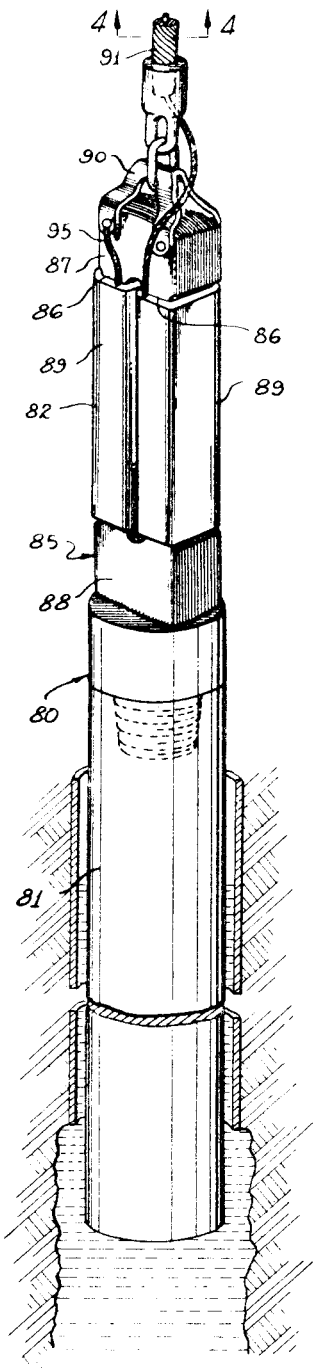
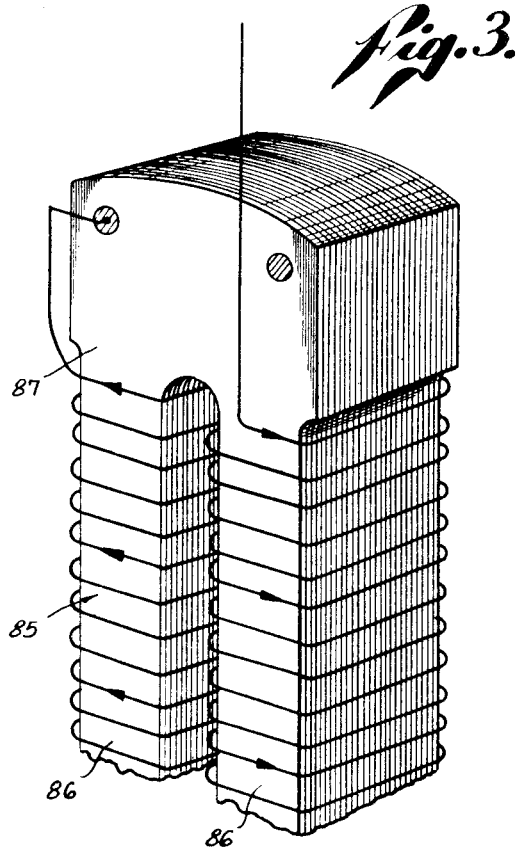
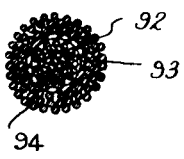
INVENTOR.
ALBERT G. BODINE
BY
Hall, Pollock & Vande Sande

United States Patent Office 3,378,075
Patented Apr. 16, 1968

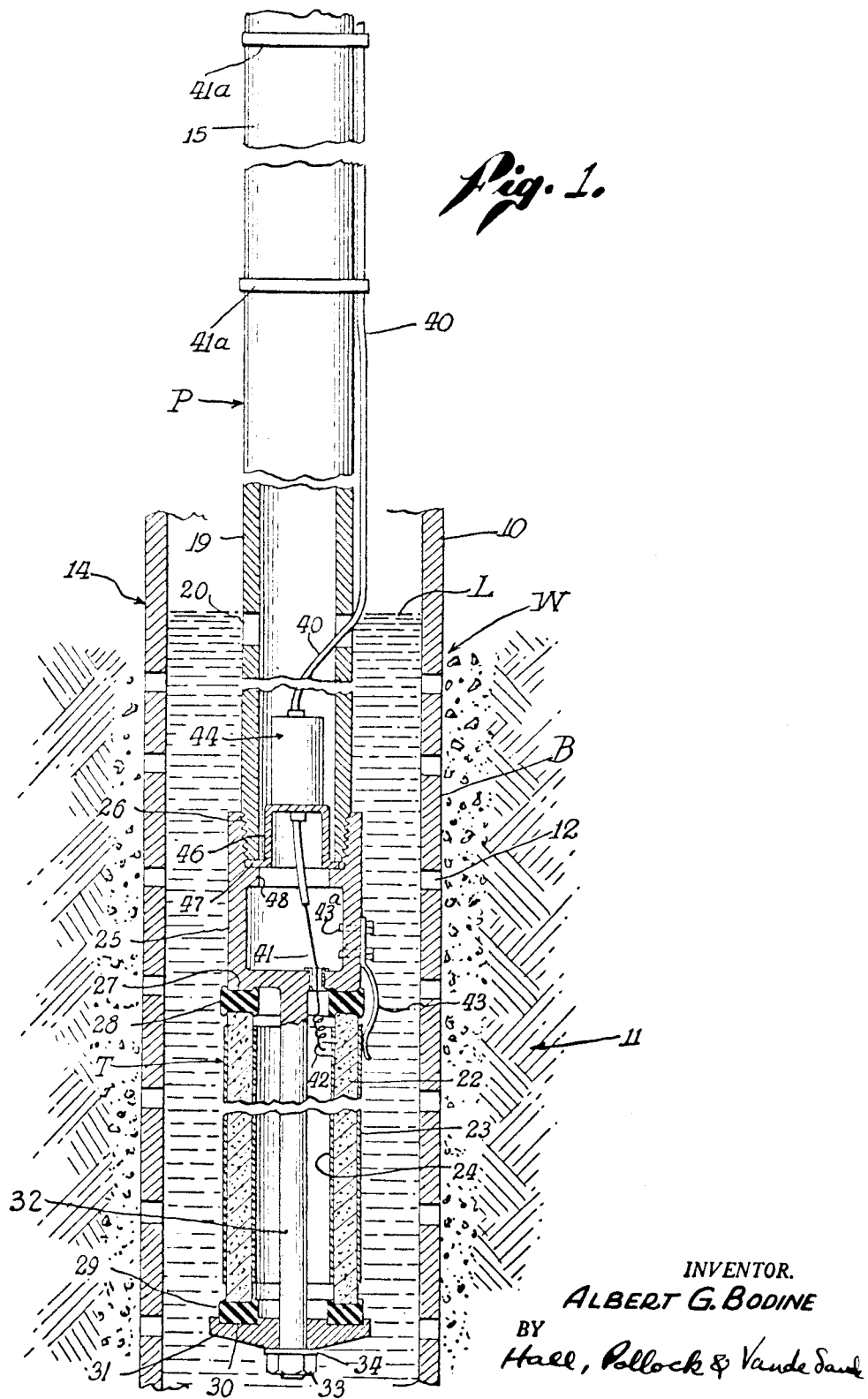

3,378,075
SONIC ENERGIZATION FOR OIL FIELD
FORMATIONS
Albert G. Bodine, Van Nuys, Calif.
Filed Apr. 5, 1965, Ser. No. 445,433
3 Claims. (Cl. 166—45)

ABSTRACT OF THE DISCLOSURE

A continuous flow of sonic energy is dissipated into a fixed region of a producing oil field formation, with said sonic energy having a critical energy level which is detectable in fluids as giving a sonic streaming effect, and which level mobilizes the oil when such energy is introduced into the formation.

---

This invention is concerned with the creation or increase of pressure in certain types of oil field earthen formations. It is more particularly concerned with a special method wherein elastic wave energy is transmitted into the formation in the form of sonic force pulses of great magnitude, so as to be uniquely capable of exerting pressure on the formation. A preferred form of this method places the formation under periodic elastic stress or stress reversals, so that the formation, by reason of its own elasticity, vibrates with (at the frequency of) the source, and depending upon the elastic stiffness of the formation in any given case, may vibrate through a displacement distance (amplitude) approaching that of the source. A typical practice of this method employs an elastic standing wave vibratory drive member which is suspended in a well in said formation with a sort of reactive coupling engagement with the formation. This impedance coupling, plus the amplitude of vibration of the formation, is established at values which uniquely exert pressure in the formation. The further method step of standing or continuous wave pattern drive, i.e. a high power rate, then results in having the pressure effect being applied to a substantial volume of formation, such that oil therein is driven more rapidly to producing wells. This is the primary object of the invention.

For an understanding of high sonic power rate reference is made to my prior copending application Ser. No. 34,805 for Sonic Drilling by Rotating the Tool, filed June 8, 1960, now U.S. Patent No. 3,211,243; and all of the following applications also disclosed subject matter discussed in said application Ser. No. 34,805. Said application Ser. No. 34,805 was a continuing application of my prior copending application Ser. No. 442,805, filed July 12, 1954, now United States Patent No. 2,970,660 for Polyphase Sonic Earth Bore Drill, granted Feb. 7, 1961. My prior application Ser. No. 225,828, filed May 11, 1951 (which was copending with my aforesaid application Ser. No. 442,805) is now United States Patent No. 2,713,472 for Sonic Earth Boring Drill With Self-Resonating Vibration Generator, granted July 19, 1955. Said application Ser. No. 225,828 was a division of my prior application Ser. No. 200,277, filed Dec. 11, 1950, now United States Patent No. 2,554,005 for Earth Boring Apparatus, granted May 22, 1951, which latter application was a continuing application of my still earlier application Ser. No. 697,235, filed Sept. 16, 1946, for Earth Boring Tool, now abandoned.

Application Ser. No. 219,088, filed Apr. 3, 1951, now United States Patent No. 2,717,763, granted Sept. 13, 1955, entitled Earth Boring Apparatus With Acoustic Decoupler for Drilling Mud, discloses that very high pressure patterns will radiate from various surfaces, shoulders and other regions of the apparatus, into a fluid body in a well, and on into the formation. Moreover, it will be noted that such method can employ various types of energy drive for pressure wave generation, for example, as shown in application Ser. No. 397,905, filed Dec. 14, 1953, now Patent No. 2,672,322, granted Mar. 16, 1954, for Sonic Earth Boring Drill.

All of said prior copending applications teach a method of using large amplitude sonic technique for transmitting formation pressure, or elastic stress. Since such apparatus can be arranged in a number of different forms, as disclosed in said prior applications, reference is hereby made to the various forms of apparatus disclosed in said prior applications. This application is concerned with a particular form and combination of pressure method. This form is concerned with the physical phenomena of fluid streaming in cells and of distance attenuation, i.e. attenuation by such as the inverse square law and wave dissipation, whereby said sonic pressure method, which locally at the input well might have an amplitude approaching that which will break some kinds of rock, will still cause high amplitude pressure phenomena, but at an amplitude below the breaking point for the formation, out some distance in the formation. In other words, the application of this sonic pressure method claimed herein will transmit periodic elastic pressure out in the formation, which is effective to accomplish the purpose herein without necessarily being up at a stress amplitude which physically breaks rock out in the formation.

Therefore if this sonic pressure method is practiced continuously in a fixed region of an oil producing formation (not having the apparatus progressing down in well depth), a standing amplitude level of wave pattern will establish a pressure condition throughout a substantial region of the producing formation. The important point is that the pressure condition will in certain oil producing formation cause a liquid propulsion action, to a surprising degree.

One theoretical explanation is that at substantial amplitude the cyclic pressure in the rock causes effective cyclic pressure in the fluid, and thus cyclically changes the pressure of the liquid trapped in the liquid filled formation pores or interstices. This is a positive propulsive phenomenon, a sort of pumping action like capillary force. For more detailed explanation reference is made to the authoritative textbook "Sonics" by Hueter and Bolt, John Wiley and Sons, Inc., New York, third printing June 1962, Library of Congress Catalog Card No. 55–6388. This pressure propulsion effect, now authoritatively called radiation pressure or "streaming," is described in said book on page 224 as being due to "intense irradiation" in the case of liquids in pores or cells; and on page 434 where it is further explained that a "periodically alternating compression" or pressure, which "requires a certain activation energy," will result in such streaming in liquids. This generally accepted authoritative concept of liquid streaming occurring in biological systems when high energy levels exist probably explains why this invention has resulted from the high force and high amplitude sonic methods above described concerning formation pressure effects in connection with drilling. The formation treating system employed herein is not only of a different magnitude from anything considered or attempted before, in earthen formation treating, but it also affects the formation in a new and unobvious way. Apparently there is a "certain activation energy" of sonics for the cellular structure of oil-filled earthen formation, similar to the phenomena in biological cells. I have found that use of this sonic pressure method will in certain oil field formations increase the propulsive transport of oils to wells, so that a well located in an oil field where this sonic pressure method is applied will produce very many more barrels per day of oil.

This method is not to be confused with sonic unclogging of oil formation pores. In other words, this method when practiced can cause the above mentioned propulsion action for as long as it is sustained, without necessarily the appearance in the produced liquid of clogging material having been removed continuously from the earthen formation. Therefore this method is not to be confused with sonic well treating for unclogging, as taught in Patents Nos. Re. 23,381 (Bodine); 2,667,932 (Bodine); 2,670,801 (Sherborne); 2,700,422 (Bodine); 2,866,509 (Brandon); and 3,016,093 (Bodine). Of course any increased flow rate per se can be expected to bring out some additional suspended matter from the formation.

The special phenomenon of sonically unclogging a well formation is a physical phenomenon which works primarily on the entrained material itself. This can be due to sonic heating, acceleration effects on liquid droplets, expansion and contraction of the formation wherein the clogging material is lodged, and similar vibratory effects primarily dislodging the clogging agent. Moreover, these patented sonic unclogging or cleaning techniques, even though "high powered" in their own realm, are by nature a matter of considerably lower power level than is this invention. In other words, this particular invention employs an elastic pressure cycle of substantial amplitude, as exemplified by the above described drill applications, in order to generate appreciable pressure "streaming" effects within the formation.

The important discovery noted here is that in an oil producing formation, where there is already a natural unidirectional pressure gradient due to flow to a producing well, this simultaneous application of continuous sonic energy in a manner and at a sonic amplitude which will also cause formation pressure effects in sonic drilling, and moreover which also apparently corresponds to a sonic amplitude which causes streaming in biological cells as explained by Hueter and Bolt, above mentioned, will in fact result in substantially increased dynamic mobilization of pressure flow effects in certain earthen pore structures in conjunction with said original unidirectional flow.

It can thus be seen that various sonic instrumentation techniques in wells, such as acoustic logging, are certainly not within the realm of this invention. In addition, this invention requires that the acoustic energy be sustained so as to keep the oil under this pressure condition for the effected time. Therefore this invention bears no relation to such subject matter as disclosed in Bodine 2,871,943, Petroleum Well Treatment by High Power Acoustic Waves to Fracture the Producing Formation. The latter process involves only a momentary application of a very high energy level in certain rock in such manner as to physically form large permanent cracks in the formation comprising this rock.

This invention is also quite different from the drill subject matter claimed in the above identified drill patent and patent applications. In the special case of drilling, a sonic stress effect is extremely concentrated by the bit teeth so as to mechanically fail the progressively and continuously exposed new rock at the hole bottom. The prior claimed sonic drilling of a well therefore is not employed where it is desired to transmit waves out into the formation to accomplish the fixed-location, sustained-pressure effect covered by the claimed structure of this patent application. In fact, Patent No. 2,970,660 and Patent No. 2,717,763 have claimed special apparatus features to reduce this transmission out into the formation, even though the method in each case discloses drilling type of formation pressuring. Sonic drilling per se, like unclogging, fracturing, etc., does not necessarily require or involve any practice of this invention.

It is important to note that this invention involves a pressure energy transmisison concept. It is not intended primarily as a device or method for expending ultimate heat energy in an oil field as the primary aim in sonic unclogging of wells, wherein the unclogging process obtains considerable benefit from having the sonic energy expended by conversion to heat. It is also important to note that this invention is not concerned with a supplementary process for aiding a water flood artificial drive in an oil field. In the latter case the application of sonics is primarily again to work upon the fluid so as to reduce the clogging thereof, so that the artificial water flooding effect can be carried on at a higher flow rate.

It should be noted that the discussion herein of continuous wave generation concerns a system where the wave pattern, in the true C.W. sense, has energy added on every cycle, even though these cycles occur as a series of modulated or interrupted pulses. It is not a shock hammer or "ring" process using repeated jarring blows such as Patent No. 2,184,809 (Brammer).

Oil field reservoirs sometimes consist of dense porous formation having very small pores. This formation is known as low permeability formation, especially when the pores are so small that capillary forces become very great. This is of course especially true in those formations where these pores are saturated with liquid. In these "tight" formations the liquid exists under a dynamic pressure equilibrium condition, especially as it flows to a well in such formation. These equilibrium conditions involve very powerful forces as regards fluid pressure, and such oil fields are very stubborn in resisting various attempts to increase the flow rate.

I have found that these capillary pressure flow equilibrium conditions can be modified by exerting pressure in the formation by my high amplitude sonic transmission method which creates high amplitude sonic periodic pressure or "streaming" within the formation itself. I have found that in some such formations this sonic streaming method will cause increased oil flow rate, with very satisfactory oil production rate being accomplished. The method operates in certain formations, and the necessary amplitude value is somewhat dependent upon the particular formation, although there is a definite minimum sonic energy flux for this effect in this whole class of responsive formations. Apparently the sonic pressure phenomenon above described when distributed through a substantial number of formation "cells" results in a great number of sonic pressure forces being added up to give a large total driving force. Authorities believe that the problem with these tight formations is that since the capillary pockets and passages (cells) are so small and that they exist in a very large number, they thus add up to a large pressure equilibrium condition. However, the sonic waves of the type employed by my method must pass through all of these pores, or cells, and thus also add up to large accumulated force within the formation. The result is a very surprising increase in flow rate with this powerful sonic process in certain formations.

There has been a considerable amount of studying and field testing in connection with well stimulation by sonics, which various investigations have been carried on over a period of a good many years. However, commercial application has not been accomplished, even though laboratory work has long indicated probable feasibility. I have discovered however that a power level commensurate with that of my oil well drill, as regards sonic energy flux delivered to the oil bearing formation by this invention, will provide the answer. This power level is the key which has remained undiscovered as regards sonic activation of oil reservoirs in the earth. Specifically I have discovered that the power level must be in excess of 1,000 watts per square foot of acoustic coupling area in order that the invention be practiced effectively. Meeting this requirement then makes possible a really commercially successful performance under actual field conditions.

Apparently the more normal sonic power levels of typical sonic apparatus used when straightforward sonic cleaning procedures are applied in a well are limited to specific effects such as localized clean-out of clogging particles in the well casing perforations and the formation interstices. However these more typical acoustic power levels do not give pronounced effects on fluid driven through the formation.

Typical apparatus forms used in the methods of these prior systems are, for example, wires or slender rods used for a sonic transmission system in a well, and another typical example is a conventionally "glued-on" crystal as an electroacoustic transducer. These methods and apparatus all inherently fall into the category of moderate power systems, even though there are relatively lower or higher powered versions in this category. In order to practice my invention with a wave transmission column, on the other hand, it is essential that the column be a robust cross-section, so as to take large compressive cyclic forces without buckling, and it is equally important that such bar structure be driven sonically at resonance. Moreover, if an electrostrictive crystal transducer be used in my system it should be clamped under conditions of elastic compression, in the manner of my copending application Ser. No. 123,207, entitled Electro-Acoustic Transducer, so as to be capable of high-power operation without the usual problems of fracturing the crystal or loosening the mounting adhesive.

When we refer to acoustic coupling area in connection with transmitted power level we are concerned with the projected interface of the transducer coupler means through which the flux of sonic energy flows to the formation. Referring to FIG. 1, for example, this is the area of surface 23. In the forms of my system where a heavy elastic column is directly connected to the formation, without the interposition of an intervening body of coupling liquid, then the acoustic coupling area is the interfacial flat area of permanent mutual solid engagement.

As a practical matter I have found that in most situations the above described power minimum rate per flux area results in an absolute value of 1,000 watts minimum in any conventional sized well in which this sonic power level is introduced.

Certain acoustic phenomena disclosed in the foregoing and hereinafter, are, generally speaking, outside the experience of those skilled in the acoustics art. To aid in a full understanding of these phenomena by those skilled in the acoustics art, and by others, the following general discussion, including definition of terms, is deemed to be of importance.

By the expression "sonic vibration" I mean elastic vibrations, i.e., cyclic elastic deformations, which travel through a medium with a characteristic velocity of propagation. If these vibrations travel longitudinally, or create a longitudinal wave pattern in a medium or structure having uniformly distributed constants of elasticity or modulus, and mass, this is sound wave transmission. Regardless of the vibratory frequency of such sound wave transmission, the same mathematical formulae apply, and the science is called sonics. In addition, there can be elastically vibratory systems wherein the essential features of mass appear as a localized influence or parameter, known as a "lumped constant"; and another such lumped constant can be a localized or concentrated elastically deformable element, affording a local effect referred to variously as elasticity, modulus, modulus of elasticity, stiffness, stiffness modulus, or compliance, which is the reciprocal of the stiffness modulus. Fortunately, these constants, when functioning in an elastically vibratory system such as mine, have cooperating and mutually influencing effects like equivalent factors in alternating-current electrical systems, and thus alternating-current analysis techniques can be used. In fact, in both distributed and lumped constant systems, mass is mathematically equivalent to inductance (a coil); elastic compliance is mathematically equivalent to capacitance (a condensor); and friction or other pure energy dissipation is mathematically equivalent to resistance (a resistor).

Because of these equivalents, my elastic vibratory systems with their mass and stiffness and energy consumption, and their sonic energy transmission properties, can be viewed as equivalent electrical circuits, where the functions can be expressed, considered, changed and quantitatively analyzed by using well proven electrical formulae.

It is important to recognize that the transmission of sonic energy into the interface or work area between two parts to be moved against one another requires the above mentioned elastic vibration phenomena in order to accomplish the benefits of my invention. There have been other proposals involving exclusively simple bodily vibration of some part. However, these latter do not result in the benefits of my sonic or elastically vibratory action.

Since sonic or elastic vibration results in the mass and elastic compliance elements of the system taking on these special properties akin to the parameters of inductance and capacitance in alternating current phenomena, wholly new performances can be made to take place in the mechanical arts. The concept of acoustic impedance becomes of paramount importance in understanding performances. Here impedance is the ratio of cyclic force or pressure acting in the media to resulting cyclic velocity or motion, just like the ratio of voltage to current. In this sonic adaptation impedance is also equal to media density times the speed of propagation of the elastic vibration.

In this invention impedance is importance to the accomplishment of desired ends, such as where there is an interface. A sonic vibration transmited across an interface between two media or two structures can experience some reflection, depending upon differences of impedance. This can cause large relative motion, if desired, at the interface.

Impedance is also important to consider if optimized energization of a system is desired. If the impedances are adjusted to be matched somewhat, energy transmission is made very effective.

Sonic energy at fairly high frequency can have energy effects on molecular or crystalline systems. Also, these fairly high frequencies can result in very high periodic acceleration values, typically of the order of hundreds or thousands of times the acceleration of gravity. This is because mathematically acceleration varies with the square of frequency. Accordingly, by taking advantage of this square function, I can accomplish very high forces with my sonic systems. My sonic systems preferably accomplish such high forces, and high total energy, by using a type of sonic vibration generator taught in my Patent No. 2,960,314, which is a simple mechanical device. The use of this type of sonic vibration generator in the sonic system of the present invention affords an especially simple, reliable, and commercially feasible system.

An additional important feature of these sonic circuits is the fact that they can be made very active, so as to handle substantial power, by providing a high "Q" factor. Here this factor Q is the ratio of energy stored to energy dissipated per cycle. In other words, with a high Q factor, the sonic system can store a high level of sonic energy, to which a constant input and output of energy is respectively added and subtracted. Circuit-wise, this Q factor is numerically the ratio of inductive reactance to resistance. Moreover, a high Q system is dynamically active, giving considerable cyclic motion where such motion is needed.

Certain definitions should now be given:

Impedance, in an elastically vibratory system, is, mathematically, the complex quotient of applied alternating force and linear velocity. It is analogous to electrical impedance. The concise mathematical expression for this impedance is $$Z = R + \sqrt{-1}\left(2\pi f M - \frac{1}{2\pi f C}\right)$$

where M is vibratory mass, C is elastic compliance (the reciprocal of stiffness, or of modulus of elasticity) and $f$ is the vibration frequency.

Resistance is the "real" part R of the impedance, and represents energy dissipation, as by friction.

Reactance is the "imaginary" part of the impedance, and is the difference of mass reactance and compliance reactance.

Mass reactance is the positive imaginary part of the impedance, given by $2\pi fM$. It is analogous to electrical inductive reactance, just as mass is analogous to inductance.

Elastic compliance reactance is the negative imaginary part of impedance, given by $1/2\pi fC$. Elastic compliance reactance is analogous to electrical capacitative reactance, just as compliance is analogous to capacitance.

Resonance in the vibratory circuit is obtained at the operating frequency at which the reactance (the algebraic sum of mass and compliance reactances) becomes zero. Vibration amplitude is limited under this condition to resistance alone, and is maximized. The inertia of the mass elements necessary to be vibrated does not under this condition consume any of the driving force.

A valuable feature of my sonic circuit is the provision of enough extra elastic compliance reactance so that the mass or inertia of various necessary bodies in the system does not cause the system to depart so far from resonance that a large proportion of the driving force is consumed and wasted in vibrating the mass. For example, a mechanical oscillator or vibration generator of the type normally used in my inventions always has a body, or carrying structure, for containing the cyclic force generating means. This suporting structure, even when minimal, still has mass, or inertia. This inertia could be a force-wasting detriment, acting as a blocking impedance using up part of the periodic force output just to accelerate and decelerate this supporting structure. However, by use of elastically vibratory structure in the system, the effect of this mass, or the mass reactance resulting therefrom, is counteracted at the frequency for resonance; and when a resonant acoustic circuit is thus used, with adequate capacitance (elastic compliance reactance), these blocking impedances are tuned out of existence, at resonance, and the periodic force generating means can thus deliver its full impulse to the "work," which is the resistive component of the impedance.

Sometimes it is especially beneficial to couple the sonic oscillator at a low-impedance (high-velocity vibration) region, for optimum power input, and then have high impedance (high-force vibration) at the work point. The sonic circuit is then functioning additionally as a transformer, or acoustic lever, to optimize the effectiveness of both the oscillator region and the work delivering region.

For very high impedance systems having high Q at high frequency, I sometimes prefer that the resonant elastic system be a bar of solid material such as steel. For lower frequency or lower impedance, especially where large amplitude vibration is desired, I use a fluid resonator. One desirable specie of my invention employs, as the source of sonic power, a sonic resonant system comprising an elastic member in combination with an orbiting mass oscillator or vibration generator, as above mentioned. This combination has many unique and desirable features. For example, this orbiting mass oscillator has the ability to adjust its input power and phase to the resonant system so as to accommodate changes in the work load, including changes in either or both the reactive impedance and the resistive impedance. This is a very desirable feature in that the oscillator "hangs on" to the load even as the load changes.

It is important to note that this unique advantage of the orbiting mass oscillator accrues from the combination thereof with the acoustic resonant circuit, so as to comprise a complete acoustic system. In other words, the orbiting mass oscillator is matched up to the resonant part of its system, and the combined system is matched up to the acoustic load, or the job to be accomplished. One manifestation of this proper matching is a characteristic whereby the orbiting mass oscillator tends to "lock in" to the resonant frequency of the resonant part of the system.

The combined system has a unique performance which is exhibited in the form of a greater effectiveness and particularly greater persistence in a sustained sonic action as the work process proceeds or goes through phases and changes of conditions. The orbiting mass oscillator, in this matched-up arrangement, is able to hang on to the load and continue to develop power as the sonic energy absorbing environment changes with the variations in sonic energy absorption by the load. The orbiting mass oscillator automatically changes its phase angle, and therefore its power factor, with these changes in the resistive impedance of the load.

A further important characteristic which tends to make the orbiting mass oscillator hang on to the load and continue the development of effective power, is that it also accommodates for changes in the reactive impedance of the acoustic environment while the work process continues. For example, if the load tends to add either inductance or capacitance to the sonic system, then the orbiting mass oscillator will accommodate accordingly. Very often this is accommodated by an automatic shift in frequency of operation of the orbiting mass oscillator by virtue of an automatic feedback of torque to the energy source which drives the orbiting mass oscillator. In other words, if the reactive impedance of the load changes this automatically causes a shift in the resonant response of the resonant circuit portion of the complete sonic system. This in turn causes a shift in the frequency of the orbiting mass oscillator for a given torque load provided by the power source which drives the orbiting mass oscillator.

All of the above mentioned characteristics of the orbiting mass oscillator are provided to a unique degree by this oscillator in combination with the resonant circuit. The kinds of acoustic environment presented to the sonic source by this invention are uniquely accommodated by the combination of the orbiting mass oscillator and the resonant system. As will be noted, this invention involves the application of sonic power which brings forth some special problems unique to this invention, which problems are primarily a matter of delivering effective sonic energy to the particular work process involved in this invention. The work process, as explained elsewhere herein, presents a special combination of resistive and reactive impedances. These circuit values must be properly met in order that the invention be practiced effectively.

Described briefly, my invention comprises a method and apparatus for increasing the flow rate of oil fields by exerting pressure in the oil bearing formation by high amplitude sonic transmissions which create high amplitude sonic periodic pressure or "streaming" within the formation. According to the the invention, the power level is in excess of 1000 watts per square foot of acoustic coupling area.

The invention will be better understood from the following detailed description of certain illustrative embodiments thereof, reference for this purpose being had to the accompanying drawings, in which:

FIG. 1 is a fragmentary vertical sectional view, with parts broken away, of one embodiment of the present invention;

FIG. 2 is a form of transducer system in accordance with the invention;

FIG. 3 is a view showing somewhat diagrammatically an electrical winding for a transducer in accordance with the invention; and FIG. 4 is a section of the cable used in FIG. 2.

In FIG. 1 is illustrated the lower end portion of an oil well W having a well bore B containing a pump P, of any desired type, installed therein. A usual casing 10 is installed in the bore of the oil well. The producing formation is designated at 11. Casing 10 is provided, in the region of this producing formation 11, with usual perforations 12. It will be understood that the upper portion of the oil well, and the ground surface equipment, may be conventional in nature, and need not be illustrated herein.

The well contains a pump tubing string 15 which leads from pump P to the ground surface. FIG. 1 shows the pump at P, the tubing string at 15, and an inlet tubing 19 extending downwardly from pump P, it being understood that suitable couplings, not shown, are provided at the junctures of pump P with the tubing string 15 and inlet tubing 19. In flowing wells the arrangement is similar, except that a pump is not necessary. The ground surface equipment at the well head may be entirely conventional, including a delivery line for the well fluids reaching the top end of tubing 15, a head for casing 10, etc., as will be well understood by those skilled in the art. Also, the well may be of the type illustrated, with a perforated casing opposite the formation, or may incorporate a perforated liner, or screen, or may be entirely open opposite the producing formation. Moreover, the presently described transducer T suspended on the lower end of tubing 19 is usually opposite a perforated portion of the casing, but may in some instances be just above or just below a perforated portion of the casing, in which case the sonic waves radiated therefrom are capable of being transmitted through the casing to the oil producing region around the casing.

Referring again to FIG. 1, inlet tubing 19 has, above the perforated portion of the casing, well fluid inlet ports 20. The well fluids must stand at least to the level of these ports 20, as indicated at L in FIG. 1, and as will presently be seen, this liquid level L is spaced substantially above the level of the sonic wave transducer T.

According to the embodiment of FIG. 1, the transducer T in accordance with the invention comprises a hollow vertically oriented cylinder 22, of an outside diameter of the order of one-half the interior diameter of the casing, and of a length which is at least substantially equal to the diameter of the well, in this instance to the inside diameter of the casing 10. The cylinder 22 is shown with a break therein, and may be advantageously considerably longer than the interior diameter of the casing, e.g., it may be a number of feet in length. This cylinder 22 is composed of electrostriction material, such as barium titanate, which is a dielectric substance capable of changing its dimensions in response to an electric field, as known. This cylinder 22 is plated with electrically conductive layers 23 and 24 on its outer and inner surfaces, respectively, so as to provide electrodes, and thus form an electric capacitor.

A cylindrical transducer mounting body 25 is screw-threaded at its upper end, as indicated at 26, onto the lower extremity of pump tubing 15. The lower portion of this cylindrical body 25 is formed with an annular seat 27, of the same interior and exterior diameters as, and vertically opposed to, the upper end of the barium titanate cylinder 22, and a resilient gasket 28 is interposed between seat 27 and the upper end of cylinder 22. A similar resilient gasket 29 engages the lower end of cylinder 22 and is engaged at the bottom by an annular seating surface 30 on an annular clamp plate 31 which is centrally bored to receive a clamp rod 32 extending downwardly from body 25. The lower end of this rod 32 is screw-threaded, as indicated, to receive a nut 33 which is set up tightly to press a washer 34 against the lower end of clamp 31. It will be clear that, by tightening up on nut 33, the barium titanate cylinder 22 is resiliently or yielding clamped vertically against the bottom of transducer body 25, and thus placed under a degree of longitudinal compression. The cylinder is thus under a certain substantial endwise elastic pressure or bias, though capable of a degree of circumferential and vertical elongation and contraction owing to the yieldability afforded in the stiff but resilient gaskets 28 and 29. This bias prevents breakage at large amplitude. Also, it will be seen that the installation is sealed so as to exclude well fluids from the interior of the cylinder.

Transducer T is fed electrically by means of an insulated electrical conductor 40 led downwardly along the pump tubing 15 from the ground surface and clipped to the tubing and to the pump as by means of clamp straps such as indicated at 41. The conductor 40 enters tubing 15 by way of one of the fluid inlet ports 20, and an electrical lead 41 fed thereby is connected by means of a suitable connector element 42 to the inner conductive layer 24 on the cylinder 22. The outer conductive layer 23 on cylinder 22 is contacted by a ground clip 43 fastened to body 25 as by fastening means 43a; and said fastening means 43a is available as an electrical ground for later described electrical components housed in the lower portion of tubing 19. Interposed in the circuit of conductor 40, and as here shown, located within the lower end portion of tubing 19 is an electrical amplifier 44; or, alternatively, the amplifier may be situated at the ground surface, output thereof conducted downwardly along the pump tubing, as by a circuit conductor such as 40, but going directly to the transducer contact 42. The electrical amplifier 44 can, of course, also be an amplifier in the form of a standard power oscillator, wherever it is located, and can be considered a generator of periodic electric power for actuating the transducer. The illustrated electrical unit 44 is shown as supported by an inverted cup 46 having an outwardly extending annular flange 47 seating on a step 48 formed within transducer body 25, and positioned by being engaged at the top by the lower end of tubing 19.

When the barium titanate transducer of FIG. 1 is energized by an oscillating electrical signal, it is subject to dimensional changes following the pulsations of the energizing signal, as well known. A barium titanate transducer in the form of a cylinder such as is provided in the present invention vibrates in the radial mode, i.e., alternately radially expands and contracts. In this vibration, the entire outside cylindrical surface alternately expands and contracts, all points on its surface moving in phase with all other points on its surface. The device functions in effect as an omni-range radiation source, sometimes known as a pulsating region. Such a transducer, radiation source or pulsating region provides good acoustic coupling to a surrounding medium, particularly to well fluids such as crude oil.

In operation, therefore, the transducer T with its large, vertically oriented cylindrical surface, of relatively large area and of relatively large vertical extent (i.e., with a vertical extension preferably equal as a minimum to the diameter of the well, or even greater, up to a number of feet), acoustically couples exceedingly effectively with the well fluids in the annulus between the transducer and the perforated casing. With this good acoustic coupling, and with high energy drive, powerful acoustic waves are thereby radiated and transmitted radially, and therefore horizontally, through the casing, and through the well fluids in the perforations to the formation. The well fluids and formation have impedances which are sufficiently well matched to one another, with a wave system having large vertical wave front, that the acoustic waves so reaching the formation are transmitted into and propagated radially outward within the formation to a substantial distance. This sound wave propagation through the producing formation results in augmented migration of the well fluids through the formation to the well, as described more fully elsewhere herein. The sonic wave energy density accomplished by the present invention is unusually high because of various features of the present invention as described hereinabove, including, importantly, the extended or unusually large vertical dimension of the cylindric radiation surface of the transducer as well as the mounting technique which allows large vibration amplitude.

Attention is particularly drawn to the fact that the well liquids stand in the annulus between the casing and pump tubing at least to the level L determined by the inlet ports 20, establishing a considerable hydrostatic head at the level of the transducer T. This head may be a number of feet in over-all height, it being noted that a portion of tubing 19 and of casing 10 has been broken away in FIG. 1 between the ports 20 and the parts of the apparatus below. In other words, the tubing 19 is preferably a few feet in length. The substantial hydrostatic head so obtained is important to the operation of the transducer, since a positive pressure bias at the interface between the well fluids and the external surface of the radially vibratory transducer cylinder tends to avoid deleterious cavitation, which would otherwise be a trouble source at the vibration amplitudes and frequencies characteristic of the transducer.

In some well installations I find it desirable to generate asymmetrical pressure cycles. This is best understood by picturing a pressure wave in which the wave pattern is such that the positive pressure phase is of greater amplitude than is the negative phase of the wave. This type of wave pattern is used in conjunction with a system where the acoustic coupling bias is limited. By use of this asymmetrical wave technique it is possible to have a pressure cycle with positive pressure peaks having amplitude value greater than the value of the acoustic coupling bias. Then the negative phase of the cycle is of an amplitude no greater than the acoustic coupling bias. Accordingly, the acoustic coupling is not taken through an extreme tension phase resulting in separation and cavitation effects. This asymmetrical wave technique is used in conjunction with very high power levels, as above described, and in situations where the acoustic coupling bias is limited. It is important to exercise caution so that the amplitude is not made too extremely great in relation to the coupling bias, so that complete violent separation and/or cavitation occurs, with resulting undesirable unloading of the transducer.

Another form of pressure cycle asymmetry is accomplished, I find, wherein the sonic flux I employ is of sufficient amplitude so as to result in nonlinear elastic phenomena in the medium being subjected to the sonic energy. This asymmetry of mathematical nonlinearity is closely related to the above described "streaming" effects.

Fortunately all forms of these asymmetrical methods used herein can frequently be measured, under ideal conditions, by installing a pressure pickup in the well fluid, or by observing accurately the shape of the wave pattern existing in the actual sonic transducer system. Very often, the pressure or stress cycle in the transducer system will reflect and indicate these nonlinear performances taking place in the region of the transducer coupling to the formation load.

FIGS. 2-4 show one of a number of forms of apparatus usable in practicing the method of this invention. Numeral 80 designates a massive, elastic, longitudinally vibratory rod in its entirety, made up, in this case, of drill collar 81 and magnetostriction generator 82. The collar 81 is a heavy collar. That is to say, it has an average cross-sectional area at least equal to that of a cylindrical rod whose diameter is equal to one-half the diameter of the well in which it is installed.

The generator 82 comprises, illustratively, a laminated steel core 85 having two parallel legs 86, and upper and lower ends 87 and 88, respectively, connecting said legs, together with windings 89 on legs 86. The total cross-sectional area of the legs 86, in all cases in which the magnetostrictive generator forms any substantial or significant portion of the elastic rod 80, is to conform to the minimum cross-sectional specification given immediately above for the collar 81.

The lower end of the core 85 is furnace-welded to a sub at the upper end of the drill collar 81, and the upper end of the core is equipped with a stirrup 90 by which the apparatus is supported from cable 91. The latter is made up of outer steel strands 92, an insulation tube 93, and a stranded copper conductor 94 inside tube 93. The lower end of this conductor is connected as shown to one of the windings 89, and the other winding is grounded, as indicated at 95. The two windings may be series connected, and so wound that the magnetic circuit is continuous around the core.

The windings are energized from a suitable generator at the ground surface, operating typically at 440 volts single phase and 200 cycles per second. The frequency range may be either above or below 200 cycles, and one of the advantages of the system is the fact that there are no mechanically imposed upper limitations on frequency. Using higher frequencies, the rod 80 becomes shortened, in accordance with known acoustic laws.

The alternating magnetization of the legs 86 causes them alternately to elongate and contract; and the force so exerted on the collar 81 causes a corresponding alternate elongation and contraction of the entire elastic rod structure 80. Assuming use of an alternating current of frequency proper to set up the alternate elongations and contractions of the legs 86 at the fundamental longitudinal resonant frequency of the rod structure 80, a half-wave type of longitudinal standing wave vibration is established with the two end portions of the rod 80 moving substantially equally and oppositely with respect to one another, while the center portion of the rod stands substantially stationary. In other words, the half-wavelength standing wave extends throughout both the collar 81 and the generator legs 86, i.e., throughout the length of the rod 80. Modified forms of the apparatus may have the generator legs occupy a relatively large or relatively short proportion of the total rod length. At the maximum, the entire rod 80 may be made up of the magnetostriction legs; at the minimum, the magnetostriction legs may occupy only an insignificant fraction of the total rod length. As stated heretofore, in cases wherein the magnetostriction legs comprise any significant part of the rod 80, they may conform to the minimum cross-sectional specification above given for the collar 81. Using such a heavy rod, effectiveness is satisfactory for many applications notwithstanding the lack of an impedance adjusting device. It is to be noted in this connection, however, that the high output impedance of the large sized elastic vibratory rod improves the coupling between the earthen formation and the alternating current generator located at the ground surface.

It is important to note that in order to obtain the high sonic energy flux contemplated herein the transducer is frequently arranged in such a way that it does not perform as an acoustic dipole. Acoustic dipoles tend to be self-neutralizing, to the extent that they greatly limit the total amount of energy which can be put into a medium. Accordingly in order to practice this invention it is sometimes important that the particular apparatus form be arranged with a baffle structure characteristic so that any dipole effect is greatly ameliorated by a dimensional arrangement which prevents an acoustic short circuit between any two surfaces which vibrate in a cancelling relationship. For example, two closely spaced surfaces vibrating in opposed phase, when submerged in a fluid into which sonic energy is desirably introduced, will tend to neutralize each other by virtue of the fact that the motion of one surface merely circulates the fluid into the region of the oppositely moving surface, with resulting lack of actual elastic pressure forces being applied on the fluid.

For example, referring to prior art apparatus it will be noted that considerable point is made of the necessity of having a typically installed crystal vibrator be relatively small and have a bulky focusing reflector, or be arranged so as to almost fit the bore of the well casing, particularly if low frequencies are going to be employed. This is because at low frequency the liquid pressure cycle would tend to be "leaked off" around the edge of the crystal. In other words, as taught in the prior art, the crystal should fit fairly closely, like a piston, so that as the bottom surface of the crystal vibrates up and down, the pressure cycle is not leaked away around the rim of the crystal, by having the energy dissipated up the casing annulus around the crystal. This problem is of course due to the fact that there is no baffle in such an arrangement. In other words, when such a crystal elongates the bottom edge of the structure to which it is glued will move in such a direction as to create a negative pressure in the liquid adjacent this bottom edge. The important point is that at the time this bottom edge of the mounting structure is generating a negative pressure, the bottom face of the crystal itself is trying to generate a positive pressure. Therefore the exposed areas of the member to which the crystal is mounted are always tending to neutralize the pressure generating effects of the main radiating surface on the crystal itself.

One limitation shown in this prior art, to reduce the problems of vibration of the mounting structure, involves making this mounting structure very heavy. In other words, it is usually taught that the crystal is fastened to a heavy and therefore high impedance mass. This is so that the mounting structure moves with minimum amplitude. However, this is very restrictive as regards the freedom of powerful vibration of the crystal itself. The important point is that this mass blocking limitation is unnecessary in an apparatus having baffle configuration.

In further analysis of the above problems it should also be noted that the bodily vibration of the structure to which the crystal is mounted also represents a dipole effect. In other words, once the mounting structure itself vibrates, the opposing surfaces thereof also constitute a dipole, like a paddle moving in a liquid body. The "front" face of a paddle is trying to generate a positive pressure, while the "back" face of the paddle is trying to generate a negative pressure, with the result that liquid merely circulates violently around the edge of the paddle with no real powerful pressures being generated in the fluid. As described in the prior art, this problem is further combated by operating at very high frequencies, so that the dimensions of the apparatus are relatively large, in relation to the wavelength generated in the fluid, so that these dipoling effects are reduced somewhat further. By employment of the above mentioned baffle provision, I am able to eliminate any need for a "piston fit" in the well casing, or a blocking impedance mass fastened to the transducer, or to very high frequency operation.

In considering the baffle feature, we note that in FIG. 1 there is a proper geometric arrangement of the apparatus. It will be noted that crystal T has its electric capacitance faces 23 and 24 arranged so that cyclic current causes the crystal T to uniformly change its whole circumferential dimension. In other words, it is a uniformly pulsing cylinder, whereby the entire outer surface increases in circumferential dimension, generating a positive pressure in the outer liquid, while at the same time the inner surface due to its expansion dimension generates a negative wave. It of course follows then that when the outer surface is generating a negative wave the inner surface is generating a positive wave. It also follows that if these two surfaces were connected through the liquid by a short path they would automatically neutralize each other. This short-circuit path is prevented in FIG. 1 by resilient packing members 28 and 29, as well as the structural elements 25 and 31. In this connection therefore the apparatus is completely independent of frequency as regards its ability to generate high power in the liquid. In the same vein, referring to FIG. 2, we note that the baffle characteristic is accomplished simply by the actual dimensions of the sonic apparatus by virtue of the fact that the sonic resonant system is quite long, so that there are a number of wavelengths in the liquid as regards the distance from the bottom radiating or coupling surface to any other surface which might tend to neutralize the large pressures generated by this bottom surface.

It will be understood that the discussions, drawings and descriptions are for illustrative purposes only and that various changes in method, design, structure, and arrangement may be made without departing from the spirit and scope of the invention as defined in the appended claims.

I claim:

1. The method of continuously operating a well in an oil producing formation in a production oil field comprising continuously dissipating resonant acoustic power in a well in which the fluid pressure is at least part of the time less than in the formation, the acoustic power being dissipated at approximately the region of said oil producing formation and at a level which is at least 1,000 watts per square foot of acoustic coupling area but substantially less than the level of acoustic power which would cause fracturing of the formation to produce acoustic streaming of the fluid from the formation to the well bore.

2. An apparatus for installation in an oil field well for augmenting pressure flow of petroleum in an earthen formation in said oil field, comprising:

an elastic standing wave member having an acoustic coupling surface in combination therewith; and a sonic generator drive means acoustically coupled to said standing wave member, said sonic generator drive means being capable of receiving power at a level which is greater than 1,000 watts per square foot of area of said acoustic coupling surface but less than the level which results in fracturing of said formation, whereby acoustic streaming of the petroleum from the formation to the well bore occurs.

3. An apparatus for exerting pressure on an earthen formation in an oil field region in said formation from a well therein, including:

a generator of periodic electric power connected to an electro-acoustic transducer in said well;

said transducer having an otuput acoustic impedance which will transmit acoustic pressure vibrations in a liquid body in said well;

said transducer having an acoustically vibratory surface coupled to said liquid so that it transmits said vibrations, said transducer also having another vibratory surface;

said transducer having acoustic baffle structure constructed and arranged to prevent a short path less than one-quarter wavelength in said liquid between said two surfaces;

whereby said transducer can radiate powerful sonic pressure energy without requiring a reflector or a close fit in the bore of said well.

References Cited
UNITED STATES PATENTS

| | | | |
|---|---|---|---|
| Re. 23,381 | 6/1951 | Bodine | 166—43 |
| 2,670,801 | 3/1954 | Sherborne | 166—177 X |
| 2,672,322 | 3/1954 | Bodine | 175—56 |
| 2,700,422 | 1/1955 | Bodine | 166—9 |
| 2,783,449 | 2/1957 | Loofbourrow | 340—10 X |
| 2,806,533 | 9/1957 | Fleck | 166—177 X |
| 2,849,075 | 8/1958 | Godbey | 340—10 X |
| 2,871,943 | 2/1959 | Bodine | 166—177 X |
| 2,974,273 | 3/1961 | Vogel et al. | 166—177 X |

CHARLES E. O'CONNELL, *Primary Examiner.*

ERNEST R. PURSER, *Examiner.*

D. H. BROWN, *Assistant Examiner.*